United States Patent

[11] 3,632,137

| [72] | Inventor | Wilfred E. Jossy |
| | | Milwaukie, Oreg. |
| [21] | Appl. No. | 888,329 |
| [22] | Filed | Dec. 29, 1969 |
| [45] | Patented | Jan. 4, 1972 |
| [73] | Assignee | Transwestern Express Company |
| | | Portland, Oreg. |

[54] SIDE SPRAY INHIBITING APPARATUS FOR WHEELED VEHICLES
11 Claims, 10 Drawing Figs.

| [52] | U.S. Cl. | 280/154.5 |
| [51] | Int. Cl. | B62d 25/16 |
| [50] | Field of Search | 280/154.5, 152 R |

[56] References Cited
UNITED STATES PATENTS

| 3,198,545 | 8/1965 | McDaniel | 280/154.5 |
| 1,034,067 | 7/1912 | Birt, Jr. | 280/154.5 |
| 2,831,702 | 4/1958 | Eaves et al. | 280/154.5 |

*Primary Examiner*—Benjamin Hersh
*Assistant Examiner*—Robert R. Song
*Attorney*—Buckhorn, Blore, Klarquist and Sparkman

ABSTRACT: Apparatus for inhibiting water spray from the sides of wheels of trucks is described, including a deflector means behind the tires for preventing the tire spray from striking the undercarriage of the trucks and a discharge means for conveying the deflected water to a point inward of the wheels where it is discharged to the ground. The deflector means may be either a brush or a solid deflector member which may contact the tire or be spaced slightly therefrom. The discharge means may be a trough positioned under the deflector to catch the deflected water. In one embodiment, the deflector member and trough are molded integral with a support member made out of plastic material.

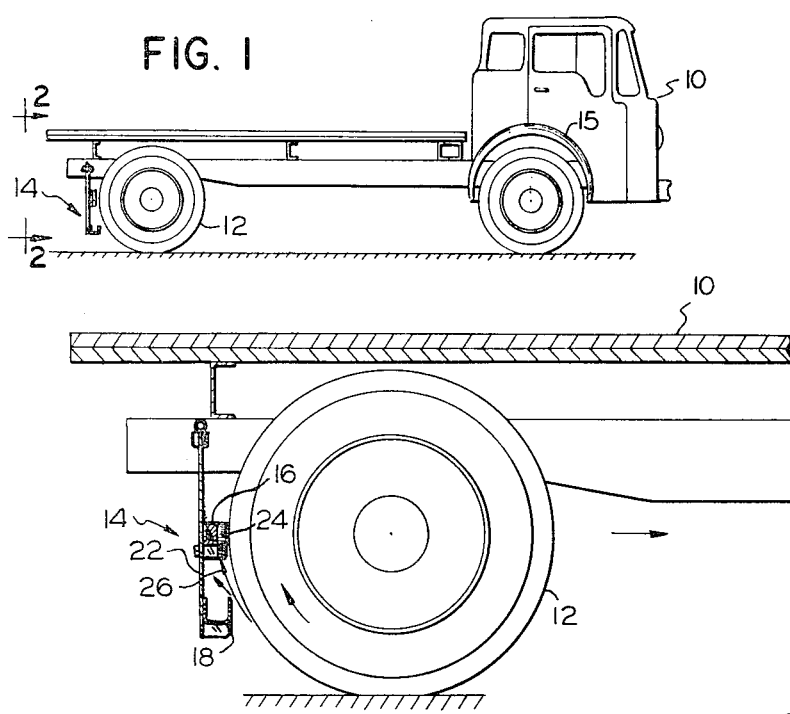
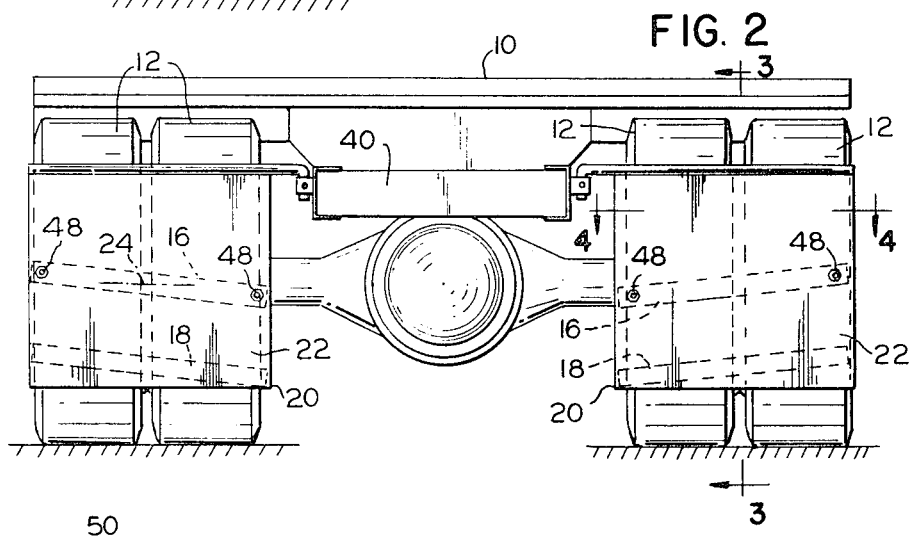

SIDE SPRAY INHIBITING APPARATUS FOR WHEELED VEHICLES

BACKGROUND OF THE INVENTION

The subject matter of the present invention relates generally to apparatus for inhibiting the spray of water from the tires of wheeled vehicles, such as trucks and the like, when traveling over wet roads and, in particular, the present apparatus includes a deflector which is positioned behind the wheel adjacent the tire and extends horizontally into the path of the spray to intercept such spray to prevent it from striking the undercarriage of the truck, and to break up the air currents which tend to cause further vaporization of the water into a fine mist or fog. As a result, the side spray mist which is emitted during wet weather from the sides of truck tires having no fenders is greatly reduced A trough is positioned adjacent the deflector to catch the deflected spray water and to convey such water inwardly of the vehicle where it is discharged to the ground at a point remote from any following wheel and remote from the sides of the vehicle.

Previously, trucks and other wheeled vehicles were conventionally provided with flexible mud flaps of rubber behind the rear wheels to prevent rocks and water from being thrown rearwardly by the wheels due to centrifugal force onto the windshields of following cars. However, nothing is done on such trucks to prevent the fine water mist which is sprayed from the side of the truck wheels and frequently blinds passenger car drivers when passing a truck. It should be noted that the fenders enclosing the wheels on passenger cars and some trucks prevent this side spray, but such fenders are not provided on most large trucks because they would reduce the size of the maximum load such trucks could carry.

The apparatus of the present invention overcomes the above-mentioned side spray problem by providing a deflector behind the wheels which intercepts a large portion of the spray before it can strike the undercarriage of the truck and be further vaporized into a mist of fine water particles. The deflector also breaks up the air currents ordinarily surrounding the truck's rotating wheels which tend to further vaporize the spray water. In addition, a trough is provided beneath the deflector to catch the water intercepted by the deflector and to discharge such water back onto the ground at a point inward of the wheel, so that such discharged water is not vaporized by air currents and distributed outward as side spray.

Another factor which contributes to the prevention of vaporization of the water spray into a mist is that the deflector in the present apparatus is positioned close to the origin of such spray so that the spray does not have a chance to diverge and disperse the water particles before it strikes the deflector. This, together with the reduction in air current, enables the solid deflector embodiment of the invention to inhibit side spray or fog even though such spray strikes the deflector and is reflected in much the same manner as when it strikes the undercarriage of the truck.

It was previously proposed during the early days of automobiles to provide brushes and scrapers on tires to remove dirt, glass and other foreign objects adhering to the tires before puncture occurs, as shown in U.S. Pat. No. 1,616,268 of LaPierre. However, such tire-cleaning apparatus was not employed as a side spray inhibiting device. Thus, the only previous apparatus for preventing the side spray involved the use of some type of fender, as shown in U.S. Pat. No. 2,831,702 of W. C. Eaves et al., and in some cases the use of perforated spray collectors under the fender, as shown by U.S. Pat. No. 3,341,222 of F. D. Roberts.

Therefore, it is one object of the present invention to provide a tire spray inhibiting apparatus which reduces the amount of water vapor emitted from the sides of a truck or other wheeled vehicle during wet road conditions.

Another object of the invention is to provide an improved spray-inhibiting apparatus of the above type in which a deflector is employed behind the wheel to intercept and deflect the spray and air current at the rear of such wheel.

A further object of the invention is to provide such a spray-inhibiting apparatus in which a discharge means, such as a trough, is employed beneath the deflector to collect the spray water striking the deflector and to discharge such water onto the ground at a point inward of the wheel.

Still another object of the present invention is to provide a spray-inhibiting apparatus of the above-mentioned type which is simple and inexpensive in construction and provides effective, trouble-free operation.

An additional object of the invention is to provide such a spray-inhibiting apparatus in which the deflector may be adjusted in its position relative to the tire.

A still further object of the present invention is to provide the above-mentioned spray-inhibiting apparatus by attaching the deflector and the trough to a vertical support which functions in the manner of a mudguard to prevent rearward spray in addition to the side spray inhibiting action of the deflector.

BRIEF DESCRIPTION OF THE DRAWINGS

Other objects and advantages of the present invention will be apparent from the following detailed description of a preferred embodiment thereof, and from the attached drawings of which:

FIG. 1 is a side elevation view of a truck having one embodiment of the side spray inhibiting apparatus of the present invention attached behind its rear wheels;

FIG. 2 is a rear elevation view of the truck of FIG. 1 on an enlarged scale;

FIG. 3 is a vertical section view taken along the line 3—3 of FIG. 2;

FIG. 4 is a horizontal section view taken along the line 4—4 of FIG. 3 on an enlarged scale;

FIG. 5 is a side elevation view of a portion of a truck having another embodiment of the invention attached thereto;

FIG. 6 is a rear elevation view of the truck of FIG. 5;

FIG. 7 is a vertical section view taken along the line 7—7 of FIG. 6 on an enlarged scale;

FIG. 8 is a horizontal section view taken along the line 8—8 of FIG. 5 on a larger scale and with parts broken away for clarity;

FIG. 9 is a rear elevation view of a portion of a truck having a further embodiment of the invention attached thereto; and FIG. 10 is a vertical section view taken along the line 10—10 of FIG. 9 on an enlarged scale.

DESCRIPTION OF THE PREFERRED EMBODIMENTS

As shown in FIG. 1, a truck 10 or other wheeled vehicle having a plurality of sets of rotating wheels with rubber tires 12 thereon is provided with a spray-inhibiting apparatus 14, made in accordance with one embodiment of the present invention, behind at least one set of wheels. It should be noted that the front wheels are not provided with such a spray-inhibiting apparatus because they are enclosed by fenders 15 which prevent side spray.

The spray-inhibiting apparatus 14 includes generally a deflector means having a projection portions which may be in the form of a brush 16 behind the tire and a discharge means which may be in the form of a trough 18 beneath such deflector, as shown in FIG. 2. The deflector brush 16 extends across the entire width of at least one tire 12, and in the embodiment shown in FIG. 2, such deflector extends across the width of two tires mounted as a pair on a common rear axle on the same side of the vehicle. The discharge trough 18 also extends across the width of the two tires and is positioned behind the tires and beneath the deflector brush 16 to catch water dripping from such brush or running down the support between such trough and such brush. The discharge trough 18 is sloped downwardly and inwardly toward the center of the car and terminates at a discharge point 20 which is inside the pair of tires so that the water flowing in such trough is transmitted to the ground at such point in order to prevent such discharged water from being vaporized and thrown outwardly as mist or spray from the side of the truck by the wind currents.

In the embodiment of FIGS. 1 to 3, the deflector brush 16 and discharge through 18 are mounted on a rigid support plate 22 of metal or other suitable material which acts as the body portion of the deflector means and is attached at its top edge to a metal rod 23 hanging by one end from a bracket 25 on the frame of the truck. The support plate 22 positions the brush so that it is barely touching or is slightly spaced from the surface of the tire 12 near a midline 24 on the rear of the tire which is spaced above the ground a distance equal to the tire radius. This enables the discharge trough 18 below such brush to have sufficient clearance with respect to the tire. It should be noted that, due to the movement of the truck in the forward direction, any water dripping from the brush will move rearward slightly before it strikes the trough 18, due to the forward motion of the truck, so that such trough may be positioned slightly to the rear of the brush and still catch most of the water. The brush may be mounted to extend across the tire closely spaced from and parallel to the trough to enable more of the deflected water spray to be collected by the trough.

The bristles of the deflector brush 16 extend horizontally from the rear of the tire for about 3 inches and form a deflector for water spray 26 emitted from the rotating tire 12 due to centrifugal force. In addition, a contacting brush removes any remaining water adhering to the surface of the tire, but rubbing contact with the tire wears out the brush bristles faster.

As shown in FIGS. 5 to 8, the deflector brush 16 may be replaced by a solid deflector member 28 of rubber or plastic material, such as nylon, which serves as the projection portion of the deflector means and is positioned in light contact with the tire so that it also acts as a scraper or is spaced slightly from the tire so that it acts solely as a deflector. The solid deflector member 28 may be secured to a rigid metal support plate or to a flexible support member 30, such as a rubber mud flap, which acts as the body portion of the deflector means. With a flexible support 30, a rigid metal frame 32 is provided around the periphery of such flexible support and attached to such support by bolts or rivets through mounting tabs 33 on the frame. This rigid frame holds the deflector 28 in position and prevents rearward flapping movement, due to air currents, as occurs with a conventional mud flap.

The metal frame 32 may be made of hollow, metal tubing which is bent in U-shape and welded to a solid hanger rod, like rod 23 of FIG. 2, or to a tubular sleeve portion at the top of the frame surrounding a solid support rod 34 to enable pivoting about such support rod. As shown in FIG. 8, the support rod 34 is provided with a bent end portion 36 of square cross section which extends downwardly into a similar shaped hole in a mounting bracket 38 attached to the body 40 of the truck. The square cross section of rod end 36 prevents the rod from turning in the bracket. However, a brace 42, having one end fixedly attached by welding to the frame 32 and its other end adjustably attached to the truck body 40, enables pivoting of such frame about rod 34 to set the deflector 28 in different positions with respect to the tire surface. Thus, a plurality of adjustment apertures 44 may be provided in such other end of brace 42 to enable a bolt 46 to be inserted through any of such apertures before screwing such bolt into a threaded hole in the side of the truck body. This changes the effective length of the brace 42 and adjusts the deflector to tire spacing.

As shown in FIG. 4, the deflector brush 16 may also be adjusted with respect to the tire 12 by mounting such brush on a pair of bolts 48 which extend through apertures in the brush back and the rigid support plate 22. The bolts 48 are surrounded by coil springs 50 positioned between the brush and such support plate to resiliently urge the brush toward the tire. The spacing of the brush bristle face from the tire is adjusted by nuts 52 threaded over the bolts 48. Coil springs 50 also take up any shock when the brush 16 strikes the tire, due to the tire hitting an obstacle or the support plate hitting a loading dock, and thereby prevents damage to the brush. Of course, the same sort of resilient mounting can be employed with the solid deflector 28 of FIG. 7.

As shown in FIG. 6, it has been found that in some instances it is desirable to slope the deflector 28 in an opposite direction to that of a trough 18 in order to prevent the water deflected and vaporized into a fine mist from being carried outwardly to the side of the truck. Thus, the deflector 28 in the embodiment shown in FIG. 6 slopes downwardly to close off the outside of the space between it and the trough 18.

Another embodiment of the invention is shown in FIGS. 9 and 10 and is similar to that in FIG. 7 except that a solid deflector 54 and a gutter 56 are formed integral with a support member 58 such as by molding out of any suitable plastic material, including nylon or rubber. As in the embodiment in FIG. 7, when the support member 58 is made of flexible material, a metal frame 32 may be provided around the periphery thereof and attached in a suitable manner by rivets extending through mounting tabs 33 on such frame.

It will be obvious to those having ordinary skill in the art that many changes may be made in the above-described details of the preferred embodiment of the present invention. For example, the gutter 18 may be replaced by other discharge means which carries the liquid inwardly to a discharge point inside the tire, such as grooves provided on the underside of the deflector itself or on the surface of the support member beneath such deflector. In addition, a plurality of deflectors may be employed one on top of the other to provide a deflector stack so that the top surface of the lower deflectors also functions as a discharge means for carrying water inwardly. Therefore, the scope of the present invention should only be determined by the following claims.

I claim:

1. Spray-inhibiting apparatus for a wheeled vehicle comprising:
   deflector means for intercepting and downwardly deflecting the spray of water and air current directed upward onto said deflector means by a rotating tire on a wheel of said vehicle;
   support means for attaching the deflector means to the vehicle and for supporting said deflector means behind said wheel, said deflector means including a body portion and a projection portion which extends across the entire width of the wheel and projects from said body portion toward said wheel to a position adjacent to the periphery of said wheel into the path of the upward spray and air current; and
   discharge means mounted below said projection portion and sloping inwardly for causing the spray water striking said deflector to flow down onto the ground at a point inward of said wheel.

2. Apparatus in accordance with claim 1 in which the projection portion of the deflector means is a brush.

3. Apparatus in accordance with claim 1 in which the projection portion of the deflector means is a scraper member having an edge adapted to contact the tire of said wheel.

4. Apparatus in accordance with claim 1 in which the projection portion of the deflector means is positioned adjacent a midpoint at the rear of the tire which is spaced from the ground by a distance substantially equal to the outer radius of said tire.

5. Apparatus in accordance with claim 1 in which the projection portion of the deflector means is a deflector member spaced from said wheel.

6. Apparatus in accordance with claim 1 in which the discharge means is a trough means supported beneath the projection portion of the deflector means and behind the wheel so that said trough means extends across the width of said wheel below said deflector means and is positioned to catch the spray water falling from the projection portion, said trough means being sloped inwardly downward to deposit the spray water back onto the road at a point remote from the path of any following wheel on said vehicle.

7. Apparatus in accordance with claim 6 in which the trough means and the projection portion of the deflector means are attached to a common support member which is the body portion of the deflector means and extends vertically downward behind the wheel and is at least as wide as said wheel to block the rearward spray from such wheel.

8. Apparatus in accordance with claim 7 in which the deflector means also slopes inward and downward so that it is substantially parallel to the trough means.

9. Apparatus in accordance with claim 7 in which the support member is a flexible support member which is fixedly supported by a rigid brace to hold the deflection means in a proper position relative to the tire on said wheel.

10. Apparatus in accordance with claim 9 which also includes adjustment means for adjusting said rigid brace to change the position of said deflection means.

11. Apparatus in accordance with claim 7 in which the deflector means, trough means and common support means are formed integrally by molding a piece of plastic material.

* * * * *